United States Patent
Aizawa et al.

(10) Patent No.: US 12,488,219 B2
(45) Date of Patent: *Dec. 2, 2025

(54) METHODS AND APPARATUS FOR DETECTING, FILTERING, AND IDENTIFYING OBJECTS IN STREAMING VIDEO

(71) Applicant: Painted Dog, Inc., New York, NY (US)

(72) Inventors: Ken Aizawa, Brooklyn, NY (US); Jared Max Browarnik, Brooklyn, NY (US)

(73) Assignee: Painted Dog, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,667

(22) Filed: Sep. 29, 2023

(65) Prior Publication Data

US 2024/0028867 A1    Jan. 25, 2024

Related U.S. Application Data

(63) Continuation of application No. 16/532,882, filed on Aug. 6, 2019, now Pat. No. 11,775,800, which is a
(Continued)

(51) Int. Cl.
*G06N 3/04* (2023.01)
*G06F 18/22* (2023.01)
(Continued)

(52) U.S. Cl.
CPC ............. *G06N 3/04* (2013.01); *G06F 18/22* (2023.01); *G06F 18/2415* (2023.01); *G06N 3/08* (2013.01);
(Continued)

(58) Field of Classification Search
CPC ........ G06V 10/44; G06V 10/40; G06V 10/82; G06V 20/46; G06V 20/64; G06V 10/764;
(Continued)

(56) References Cited

U.S. PATENT DOCUMENTS 8,676,803 B1   3/2014  Leung et al.
11,775,800 B2  10/2023 Aizawa et al.
(Continued)

FOREIGN PATENT DOCUMENTS

EP    0464327 A2    1/1992

OTHER PUBLICATIONS

Office Action with translation in Korean App. No. 10-2023-7019192 dated Mar. 5, 2024, 8 pages.
(Continued)

*Primary Examiner* — Margaret G Webb
(74) *Attorney, Agent, or Firm* — Smith Baluch LLP

(57) ABSTRACT

Training neural networks to recognize matching items requires large data sets and long training times. Conversely, training a neural network with triplets of similar objects instead of triplets of identical objects relaxes constraints on the size and content of the data set, making training easier. Moreover, the notion of "similarity" can be almost arbitrary, making it possible to train the neural network to associate objects that aren't visually similar. For instance, the neural network can be trained to associate a suit with a tie, which is not possible with training on identical objects. And because the neural network is trained to recognize similar items, it can also recognize unfamiliar items if they are similar enough to the training data. This is a technical improvement over other neural networks, which can only recognize identical items, and over collaborative filtering systems, which can only recognize items for which they have enough data.

24 Claims, 9 Drawing Sheets

Related U.S. Application Data continuation of application No. PCT/US2018/017545, filed on Feb. 9, 2018.

(60) Provisional application No. 62/456,970, filed on Feb. 9, 2017.

(51) Int. Cl.
| | | |
|---|---|---|
| *G06F 18/2415* | (2023.01) | |
| *G06N 3/08* | (2023.01) | |
| *G06N 20/10* | (2019.01) | |
| *G06V 10/44* | (2022.01) | |
| *G06V 10/764* | (2022.01) | |
| *G06V 10/82* | (2022.01) | |
| *G06V 20/40* | (2022.01) | |

(52) U.S. Cl.
CPC .......... *G06N 20/10* (2019.01); *G06V 10/454* (2022.01); *G06V 10/764* (2022.01); *G06V 10/82* (2022.01); *G06V 20/40* (2022.01)

(58) Field of Classification Search
CPC ...... G06V 20/00; G06V 10/42; G06V 10/467; G06V 10/75; G06V 20/653; G06V 20/698; G06V 40/14; G06V 10/7515; G06V 2201/10; G06V 40/103; G06V 10/245; G06V 10/443; G06V 10/751; G06V 10/774; G06V 10/776; G06V 10/95; G06V 20/20; G06V 20/42; G06V 20/44; G06V 20/56; G06V 20/584; G06V 20/647; G06V 30/10; G06V 30/226; G06V 30/262; G06V 30/347; G06V 40/166; G06V 10/00; G06V 10/141; G06V 10/143; G06V 10/145; G06V 10/20; G06V 10/247; G06V 10/25; G06V 10/255; G06V 10/457; G06V 10/60; G06V 10/753; G06V 10/757; G06V 10/761; G06V 10/7625; G06V 10/763; G06V 10/768; G06V 10/7753; G06V 10/7788; G06V 10/80; G06V 20/10; G06V 20/176; G06V 20/40; G06V 20/41; G06V 20/52; G06V 20/54; G06V 20/58; G06V 20/582; G06V 20/586; G06V 20/625; G06V 20/80; G06V 2201/03; G06V 2201/06; G06V 30/422; G06V 40/10; G06V 40/1318; G06V 40/16; G06V 40/172; G06V 40/176; G06F 18/22; G06F 16/9535; G06F 3/0482; G06F 16/90335; G06F 16/24578; G06F 3/0485; G06F 16/951; G06F 16/9538; G06F 16/29; G06F 3/011; G06F 3/0481; G06F 3/04817; G06F 3/04845; G06F 40/106; G06F 16/904; G06F 21/6218; G06F 2221/2141; G06F 2221/2149; G06F 3/04842; G06F 3/04847; G06F 30/23; G06F 18/24; G06F 3/016; G06F 40/103; G06F 16/2425; G06F 16/3322; G06F 16/35; G06F 16/36; G06F 16/5838; G06F 17/10; G06F 3/0304; G06F 3/04815; G06F 3/167; G06F 30/20; G06F 30/28; G06F 1/3231; G06F 1/3265; G06F 1/3287; G06F 15/16; G06F 16/243; G06F 16/248; G06F 16/275; G06F 16/284; G06F 16/334; G06F 16/444; G06F 16/532; G06F 16/5854; G06F 16/686; G06F 16/84; G06F 16/958; G06F 17/00; G06F 21/31; G06F 3/02; G06F 3/0202; G06F 3/0362; G06F 3/042; G06F 3/0487; G06F 3/0488; G06F 3/04883; G06F 3/04886; G06F 3/14; G06F 30/00; G06F 9/06; G06F 11/004; G06F 11/008; G06F 11/0709; G06F 11/076; G06F 11/0793; G06F 16/00; G06F 16/1744; G06F 16/178; G06F 16/219; G06F 16/221; G06F 16/2219; G06F 16/2282; G06F 16/24; G06F 16/2423; G06F 16/2455; G06F 16/258; G06F 16/26; G06F 16/285; G06F 16/313; G06F 16/316; G06F 16/3329; G06F 16/355; G06F 16/358; G06F 16/367; G06F 16/4387; G06F 16/55; G06F 16/587; G06F 16/639; G06F 16/7834; G06F 16/90332; G06F 16/93; G06F 16/95; G06F 16/9536; G06F 16/9537; G06F 18/00; G06F 18/2413; G06F 18/25; G06F 21/316; G06F 2201/81; G06F 2203/04806; G06F 2209/543; G06F 3/00; G06F 3/01; G06F 3/012; G06F 3/013; G06F 3/017
See application file for complete search history.

(56) References Cited

U.S. PATENT DOCUMENTS

| | | | |
|---|---|---|---|
| 2011/0293173 A1 | 12/2011 | Porikli et al. | |
| 2012/0296776 A1 | 11/2012 | Kalai et al. | |
| 2016/0100151 A1 | 4/2016 | Schaffer et al. | |
| 2016/0180151 A1 | 6/2016 | Philbin et al. | |
| 2016/0350834 A1* | 12/2016 | Wilson | G06Q 30/0631 |
| 2016/0378863 A1 | 12/2016 | Shlens et al. | |
| 2017/0140248 A1 | 5/2017 | Wang et al. | |
| 2017/0161919 A1 | 6/2017 | Schroeder et al. | |
| 2017/0337449 A1 | 11/2017 | Hamada et al. | |
| 2018/0018451 A1 | 1/2018 | Spizhevoy et al. | |
| 2018/0053042 A1* | 2/2018 | Philbin | G06N 3/084 |
| 2018/0121798 A1* | 5/2018 | Barkan | G06F 16/00 |
| 2018/0165546 A1 | 6/2018 | Skans et al. | |
| 2019/0318405 A1 | 10/2019 | Hu et al. | |

OTHER PUBLICATIONS

Extended European Search Report in European Patent Application No. 18752031.7 dated Dec. 16, 2020, 8 pages.
International Search Report and Written Opinion in International Patent Application No. PCT/US2018/017545 mailed Apr. 23, 2018, 9 pages.
Korean Office Action with English Translation in Korean App. No. 10-2019-7026125 dated Apr. 23, 2022 13 pages.
Schroff et al. "Facenet: A unified embedding for face recognition and clustering." Proceedings of the IEEE conference on computer vision and pattern recognition. 2015. 9 pages.
Office Action in European Patent Application No. 18752031.7 dated Jan. 7, 2025, 5 pages.
Office Action (NOA) with translation in Korean App. No. 10-2023-7019192 dated Nov. 22, 2024, 8 pages.
Weinberger, et al. "Distance metric learning for large margin nearest neighbor classification." Journal of Machine Learning Research 10.2 (2009), 38 pages.

* cited by examiner

210 — 1. Collect User-Product purchase matrix

Products
```
   A B C D E F
A [1 1 0 1 0 0]
B [0 0 0 1 1 1]    212
C [1 1 0 1 0 1]
```

220 — 2. Cluster products using features learned using collaborative filtering

```
[1 1 0 1 0 0]
[0 0 0 1 1 1]    222
[1 1 0 1 0 1]
```

224 — 3. Generate triplets

Triplets: (*anchor, positive, negative*)
(A, B, C), (A, B, D), (A, B, E), (A, B, F)
(C, E, A), (C, E, B), (C, E, D), (C, E, F)    232
(D, F, A), (D, F, B), (D, F, C), (D, F, E)

230 — 4. Train a deep convolutional neural network using product images of products A-F $$\begin{bmatrix} 1 & 1 & 0 & 1 & 0 & 0 \\ 0 & 0 & 0 & 1 & 1 & 1 \\ 1 & 0 & 1 & 0 & 1 & 1 \end{bmatrix} \approx \begin{bmatrix} ? & ? \\ ? & ? \\ ? & ? \end{bmatrix} \times \begin{bmatrix} ? & ? & ? & ? & ? & ? \\ ? & ? & ? & ? & ? & ? \end{bmatrix}$$

MATRIX FACTORIZATION (EXAMPLE OF COLLABORATIVE FILTERING)

FIG. 2B

METHODS AND APPARATUS FOR DETECTING, FILTERING, AND IDENTIFYING OBJECTS IN STREAMING VIDEO

CROSS-REFERENCE TO RELATED APPLICATION(S)

This application is a continuation of U.S. application Ser. No. 16/532,882, filed Aug. 6, 2019, entitled "Methods and Apparatus for Detecting, Filtering, and Identifying Objects in Streaming Video," which is a continuation on International PCT Application No. PCT/US2018/017545, filed Feb. 9, 2018, entitled "Methods and Apparatus for Detecting, Filtering, and Identifying Objects in Streaming Video," which claims a priority benefit, under 35 U.S.C. 119(e), of U.S. Application No. 62/456,970, filed on Feb. 9, 2017, and entitled "Methods and Apparatus for Detecting, Filtering, and Identifying Objects in Streaming Video." These applications are incorporated herein by reference in their entirety.

BACKGROUND

Similarity rankings are often used in e-commerce to recommend products to shoppers. Most similarity ranking methods fall under one of three categories: collaborative filtering, content-based filtering, or a combination of the two. Collaborative filtering involves extracting features or patterns from multiple user agents or data streams in order to determine similarity rankings. For instance, an item-to-item collaborative filtering engine for generating product recommendations extracts features from user interactions with items. The similarity between two items is computed by, for instance, measuring the similarity between the set of users that have purchased the first item and the set of users that have purchased the second item. The intuition is that items that are commonly bought by similar individuals are related.

Content-based filtering involves extracting features or patterns from a single data source in order to determine similarity rankings. For instance, an item-to-item content-based filtering engine for generating product recommendations extracts features from item characteristics. The similarity between two items is computed by determining the number of characteristics shared by the two items. The intuition is that items that share many characteristics are related.

Unfortunately, item-to-item recommendation systems that use collaborative filtering are ineffective when many item pairs have no common customers or when there are insufficient data. Collaborative filtering is particularly ineffective when the end goal is to generate insight in a domain that cannot be modeled adequately by the various data streams which the filtering algorithm takes as input. For instance, an item-to-item collaborative filtering engine for generating product recommendations may assign a high similarity score between a chair and table because the data suggest that users who buy tables tend to buy chairs to match the tables. However, in this instance, one might instead like to purchase a chair with similar design features. In these instances, the similarity between two items cannot be computed with high confidence or at all using collaborative filtering. In these instances, utilizing features extracted from the items themselves as in content-based filtering may prove more effective.

Similarly, item-to-item recommendation systems that use content-based recommender systems are ineffective when the algorithm cannot identify any useful features in an item. For instance, an item-to-item content-based recommender system for generating product recommendations based on a simple Euclidean pixel-wise distance metric may assign a low similarity score between a first 100 pixel×100 pixel image of an item against a white background and a second 100 pixel×100 pixel image of that same item against a black background. In this case, each pixel in the image is a feature of the item represented in the image. Each background pixel of the first image is marked as dissimilar to the corresponding pixel in the second image because it is a different color and each item pixel of the first image is marked as similar to the corresponding item pixel in the second image because it is the same color. In these instances, a more robust feature extraction method is required to identify background pixels as irrelevant features and item pixels as relevant features.

SUMMARY

Embodiments of the present technology include a method for training a neural network suitable for using in a similarity ranking engine. This method comprises generating a plurality of triplets of training vectors. Each triplet in the plurality of triplets includes a reference data point, at least one positive data point, and at least one negative data point. The reference data point represents a first object, the positive data point represents a second object similar to the first object, and the negative data point represents a third object dissimilar to the first object. The method also comprises training the neural network on the plurality of triplets to determine parameters of the neural network. This training includes, for each triplet in the plurality of triplets: passing the reference data point, the positive data point, and the negative data point in each triplet through the neural network to generate extracted features; calculating a loss from the extracted features; and adjusting the parameters of the neural network based on the loss.

In some cases, generating the plurality of triplets comprises classifying images as reference data points and positive data points.

And in some cases, each triplet in the plurality of triplets comprises a plurality of positive data points and/or a plurality of negative data points. In these cases, calculating the loss from the extracted features comprises reducing or minimizing an objective loss function for the plurality of positive data points and/or the plurality of negative data points in each triplet.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A and 2B illustrate a process of collaboratively filtering data into triplets for training a neural network.

DETAILED DESCRIPTION

Neural-Network-Based Similarity Ranking Engines

Figure 1:
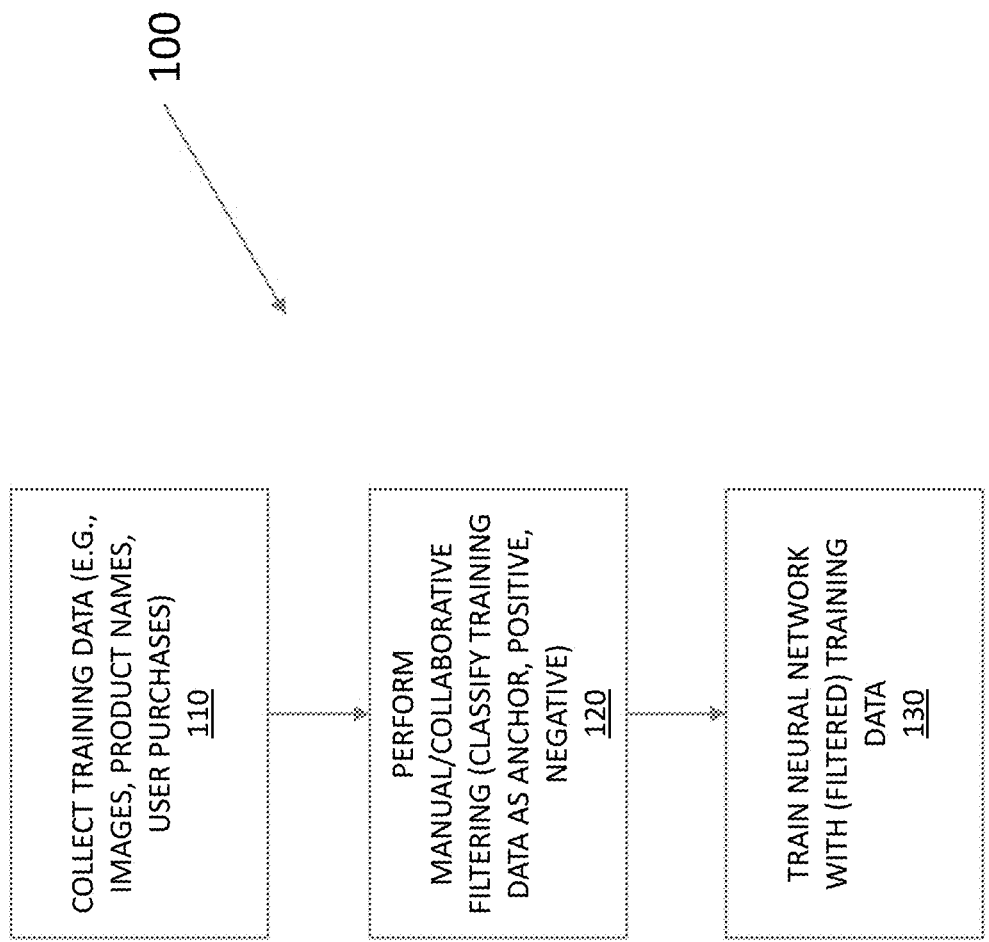
FIG. 1 shows a process of collecting raw data for forming triplets of anchor (reference), similar (positive), and dissimilar (negative) items, filtering the data into the triplets, and training a neural network with the triplets.

Similarity ranking engines, also called similarity systems, can be implemented using neural networks, e.g., for applications in product recommendation systems in e-commerce. A neural network can be considered a machine learning tool that models data using one or more connected layers of neural units. Inputs are passed through the neural network layer-by-layer, with the output of each layer serving as the input of the next layer, until the output layer is reached. The output of each neural unit is determined by its input, a set of parameterized weights, and a linear or non-linear activation function. Mathematically, neural networks represent a class of non-linear and linear mapping functions of inputs to outputs.

A similarity ranking engine can use a neural network trained to extract features particularly conducive for generating accurate similarity rankings between items. Such a similarity ranking engine may use a non-linear or linear mapping function instead of a neural network, which are equivalent. (The terms "neural network" and "mapping function" are used interchangeably here.) The similarity ranking engine can be implemented in part or in whole on a computer processor, graphics processor, cloud computing service, or other device or combination of devices suitable for performing neural network/mapping function computations.

The input of a neural network model or mapping function is raw data, typically expressed as a vector of numbers, each of which represent quantitative aspects of an item of interest. For instance, the raw data may represent red-green-blue (RGB) pixel data of a color image, a waveform representation of an audio clip, a bag-of-words representation of a text passage, or any other quantity that can be expressed numerically. The output of the neural network model and mapping function is a vector of numbers each representing the probability of the existence of a learned feature in the input. The output is often referred to as "feature representation," "feature embedding," "representation," "embedding," or "feature vector." The parameters of the neural network model and mapping function determine the linear and/or non-linear transformations that produce an output given an input.

Addressing Practical Constraints on Training Neural Networks

Unfortunately, it can be impractical, difficult, or even impossible to collect and label enough data to train the neural network effectively to recognize identical objects. In a typical training regime, a neural network is trained using images showing different views of the same object as well as images of different objects. For instance, the neural network might be trained to recognize pants with a training set that includes images of different models wearing the same pants or images of the same pants taken from different perspective as well as images of other pants, dresses, shorts, and other clothing. After repeated presentations of these images, the neural network "learns" to distinguish the desired pants from other objects.

The quality of training scales with the number of images in the training set (i.e., a neural network trained on more images will do a better job identifying objects), so it is generally desirable to have as many images as possible in the training set. Moreover, the training set should include many sets of tagged images of identical objects.

Rather than train a neural network on different images of the same object, the inventive technology involves training a neural network on images of similar objects. More specifically, the neural network is trained using triplets that each include an anchor image of an item, a positive image of a similar item, and a negative image of a dissimilar item ("similar triplets") instead of triplets that each include an anchor image of an item, a positive image of the same item, and a negative image of a different item ("same triplets"). In other words, the inventive technology relaxes constraints on the "exactness" of positives and negatives in the training set. This makes it possible to train the neural network with a much smaller data set. It also enables new capabilities for a similarity ranking engine using the trained neural network as explained in greater detail below.

Drawbacks of Content-Based Recommendations

Training a neural network to recognize similar objects instead of identical objects enables new applications in addition to relaxing constraints on the training data used to train the neural network. For example, a neural network trained to recognize similar objects can form the basis of a recommender system or recommendation engine that can identify objects that are similar in respects other than appearance. Such a recommendation engine can recommend items with extrinsic similarity (and possibly without intrinsic similarity) as well as abstract items, such as movies, television shows, news stories, and so on instead of being limited to recommending items that are visually similar. This overcomes the drawbacks of content-based recommender systems, which tend to be limited to recommending items based solely on the items' intrinsic features as discussed below.

A content-based recommender system for products might utilize a deep convolutional neural network to extract relevant intrinsic features from images of products. The neural network might be optimized using a metric learning objective function (e.g., triplet loss, n-pair loss, or another suitable metric learning objective) that uses relative positive and negative pairings of training examples. Positive pairs of images are taken to be images of the same objects or the same object category, and negative pairs are taken to be images of different objects or different object categories. Optimizing the objective function, for example, using stochastic gradient descent, results in a model that can project the item into vector space in which projections of images of similar objects are nearby and projections of images of dissimilar objects are far apart. To produce a recommendation, an example can be projected into this vector space and using nearest neighbor search, the nearest projection in this vector subspace is selected for recommendation. This is an example of a content-based recommender system because the content of the object's attributes themselves are used to generate recommendations. Content-based recommender systems including those which use a metric learning objective come in many flavors and may use a variety of objective functions, optimization methods, modalities of training data, etc.

For a different modality, like clothing or movie recommendations, a content-based recommender system is insufficient. Content-based filtering, according to which positive pairs of images are images of the same object or object category, and negative pairs of images are images of different objects or object categories, can match two similar looking suits, but cannot recommend a matching pair of shoes. In the case of a content-based recommender system for movies, "Star Wars Episode I" might be matched with "Star Wars Episode II" by virtue of their similar naming, or to "Star Trek" by virtue of a shared genre, but not "Lord of the Rings" because there is no obvious, shared content between the two movies. Furthermore, in the case of using metric learning methods for a content-based recommender system, it is difficult to find a large body of instance-level or category-level labeled training data or an application which would benefit from a model trained with such supervision.

Collaborative Filtering and the Cold Start Problem

Recommender systems which deal with data modalities for which the object content is insufficient for generating quality recommendations benefit from using collaborative filtering. But collaborative filtering suffers from other problems, including the Cold Start problem discussed below. Fortunately, the Cold Start problem can be addressed with a neural network trained to recognize similar objects as discussed in greater detail below.

In an item-to-item recommender system that uses collaborative filtering to match, for example, two similar movies, movies might be represented in an n×m-dimensional matrix for n movies and m users. Each entry corresponds to a binary encoding of a user's enjoyment of a specific movie. In the m-dimensional vector user-space, movies enjoyed by individuals with similar taste lie closer together in user-space, while movies enjoyed by individuals with different tastes lie further apart. Likewise, users with similar tastes may lie closer together in the n-dimensional vector movie-space and the innovation might be used to connect such similar users. This differs from content-based recommender systems because the features used are not intrinsic characteristics of the objects themselves and relies on the assumption that extrinsic characteristics like movie co-viewership is relevant for generating recommendations.

Collaborative filtering is a broad category of methods which might potentially come with improvements based on new research as shown below in TABLE 1. These include matrix factorization methods which are used to reduce the dimensionality of the original n×m-dimensional matrix where n and/or m might be prohibitively large. In this case, the vector user-space and movie-space for matching movies and users might be reduced to a p-dimensional vector user-space (p<<m and/or p<<n). The n×p- and p×m-dimensional space is optimized such that the matrix multiplication of the two factorized matrices will minimally deviate from the full n×m-dimensional matrix. Using the squared error as a loss function, an optimal factorization can be achieved using coordinate descent. As a result, movies and users may be matched in p-dimensions instead of the original n- and m-dimensions (e.g., as in FIG. 2B). In TABLE 1, Alice and Kevin are more similar to each other than Alice and Jared or Kevin and Jared.

TABLE 1

Collaborative Filtering

| | Star Wars I | Star Wars II | Star Trek | Lord of the Rings | La La Land | Godzilla |
|---|---|---|---|---|---|---|
| Alice | 1 | 1 | 0 | 1 | 0 | 0 |
| Kevin | 0 | 0 | 0 | 1 | 1 | 1 |
| Jared | 1 | 1 | 0 | 1 | 0 | 1 |

$\|Alice-Kevin\|_2 < \|Alice-Jared\|_2 < \|Kevin-Jared\|^2$

Collaborative-filtering recommender systems commonly suffer from cold start problems in which a new item that has no data (e.g., in the case of movies, ratings; and in the case of products, purchases) is never recommended. In TABLE 2, for instance, Jack is a new user with no associated product data. Without this data, the collaborative-filtering recommender system cannot meaningfully measure a similarity between the new user, Jack, and the other users before the new user has interacted with the product (here, the movies listed in TABLE 2).

TABLE 2

Cold Start Problem of Collaborative Filtering

| | Star Wars I | Star Wars II | Star Trek | Lord of the Rings | La La Land | Godzilla |
|---|---|---|---|---|---|---|
| Alice | 1 | 1 | 0 | 1 | 0 | 0 |
| Kevin | 0 | 0 | 0 | 1 | 1 | 1 |
| Jared | 1 | 1 | 0 | 1 | 0 | 1 |
| Jack (new) | 0 | 0 | 0 | 0 | 0 | 0 |

Hybrid Recommendation Systems

Collaborative filtering would benefit from content-based recommender systems that rely solely on the object's intrinsic properties to generate recommendations. Furthermore, collaborative filtering methods would benefit from the lessons learned from deep learning in general to apply the deep pattern recognition capabilities for feature extraction to serve recommendations as with recent deep metric learning methods for content-based recommenders.

To date, deep metric learning methods commonly used in content-based recommender systems have only been used in conjunction with category- and/or instance-level supervision applied to problems like object re-identification and facial recognition. However, for the majority of applications of recommender systems, the goal is not to re-identify an object, but to recommend a new item in the same or a different item category as collaborative filtering does. Such applications should harness information that is not captured intrinsically within item characteristics (e.g., visual appearance, categorization) but extrinsically and may vary based on highly non-stationary factors (e.g., culture, trends, geography). Both intrinsic and extrinsic factors can be important. For instance, matching a suit with a pair of shoes may depend on both the visual features of the suit and the pair of shoes, but in the context of the current trends and user preferences.

Training a neural network to recognize similar but not identical objects combines advantages of collaborative filtering and content-based recognition. This is because a neural network trained on similar objects can be used in a recommendation engine that can match items based on their intrinsic properties (e.g., appearance), their extrinsic properties (e.g., current trends, user interactions, related purchases), or a combination of intrinsic and extrinsic properties. Conversely, other recommendation engines match based on intrinsic properties only, collaborative filtering, or hybrid of both as described in the background section above.

A recommendation engine with a neural network trained on similar triplets can recommend items based on their intrinsic and/or extrinsic properties because the concept of "similarity" can be extended beyond visual similarity as discussed below. For example, a similar triplet may include objects that are similar because they are used or worn together, such as a shirt and tie, even if they don't look similar to each other. Similarity is flexible and subjective, whereas "same" in other triplet loss functions is more objective.

Moreover, the similar objects used to train the neural network can be selected using collaborative filtering, effectively combining the advantages of collaborative filtering and content-based recognition: collaborative filtering links extrinsically similar items for training, and training converts the extrinsic similarities into content for subsequent content-based recognition using the trained neural network.

A recommendation engine with a neural network trained on similar triplets enables a bridging among content-based recommenders, collaborative filtering, and deep metric learning. This offers at least three technical advantages over other systems: (1) by using as input features both intrinsic and extrinsic features of items, the features are themselves re-contextualized in virtue of the information independently carried in each, enabling richer embeddings; (2) by using a deep learning model, higher levels of abstraction can be used to improve the performance of a collaborative-filtering recommender system; and (3) by going beyond instance- and category-level supervision for deep metric learning, it makes applications particularly suited to collaborative filtering available to robust content-based recommendation.

Training a Neural Network for a Similarity Ranking Engine with Similar Triplets

FIG. 1 illustrates a process 100 for training a neural network for a similarity ranking engine or recommendation engine using training data, such as images, in the form of triplets. The process 100 begins with collecting data (110) for forming into triplets. This data may include images, waveform representations of audio clips, bag-of-words representations of text, or any other quantity that can be expressed numerically. The data can be collected using any of a variety of methods, including keyword-searching a collaboratively filtered (image) database or simply reviewing a set of images.

If the data is not tagged or pre-filtered, e.g., through prior collaborative filtering, it is tagged, filtered, otherwise organized into triplets (120). Each triplet comprises one reference (anchor) data point, at least one positive (similar) data point, and at least one negative (dissimilar) data point. A given triplet may have more than one positive or negative data point, e.g., it may include two, three, four, five, or more positive or negative data points. Put differently, there may be multiple negative data points and/or multiple positive data points for a given reference data point, all of which can be used during training. The number of triplets may be augmented by generating different combinations of positive data point(s) and negative data point(s) for each reference data point.

The reference data point and positive data point(s) may be classified beforehand as data corresponding to similar items. These items may be considered similar because they are visually similar, i.e., they look similar. For instance, the reference data point may represent a particular article of clothing, such as a black dress, and the positive data point may represent a similar (but not identical) article of clothing, such as another black dress. But similar items don't have to be visually similar. They may be considered similar for other reasons as well, such as they are frequently purchased together (e.g., winter coats and snowpants, dress shirts and ties, etc.), they match each other (e.g., a dark gray suit and black shoes), they are related (e.g., movies or television shows in a particular genre or starring a particular actor), and so on. In these cases, the items are similar without being visually similar; indeed, a triplet with visually dissimilar reference and positive data points may include a negative data point that is visually similar to either the reference data point or the positive data point.

Similarity and dissimilarity may be functions of an item's intrinsic properties, such as its appearance or intended use, or of its extrinsic properties, such as its popularity. An item's extrinsic properties may also vary with time: for example, a particular combination of dress and shoes may come into vogue in the summer, then fall out of fashion in the winter. In this case, the dress and shoes may be categorized as similar in the summer and dissimilar in the winter. Likewise, items may be classified as similar in some geographic areas and dissimilar in other areas (e.g., baseball gloves may be similar to Yankees baseball hats and dissimilar to Red Sox baseball hats in New York but similar to Red Sox baseball hats and dissimilar to Yankees baseball hats in Boston). Items whose similarity varies as a function of an independent variable, such as time or location, are said to have non-stationary similarity distributions, whereas items whose similarity remains static are said to have stationary similarity distributions. For instance where the similarity distribution changes over time, time may be used as an input feature of the neural network.

The reference data point and the negative data point(s) may or may not have been classified beforehand as data corresponding to a dissimilar item(s). For instance, the negative data point(s) for a given reference point may be selected by randomly sampling from the set of all data points that are not positive data points for the given reference data point. Thus the point(s) randomly selected as negative data point(s) may actually be true positives—i.e., the negative data point(s) may represent an item that is the same as or to the item corresponding to the reference data point. With large data sets, the likelihood of the randomly sampled negative data point(s) corresponding to the same or similar item as the item corresponding to the reference data point is negligible.

Data classification benefits from a guarantee of a low false positive rate and uses random sampling to reduce or minimize false negatives with no equivalent guarantee. By eliminating the false negative guarantee, the data set for achieving effective results may be reduced or minimized without compromising the robustness of the model, thereby simplifying training. For example, it may include between $2 \times 10^3$ and $10^6$ total unique images, where there are four images per class (a class is a group of visually similar items). A data set of $2 \times 10^3$ total unique images with four images per class yields approximately $5 \times 10^6$ unique triplets, whereas a data set of $10^6$ total unique images with four images per class yields approximately $1.25 \times 10^{12}$ unique triplets.

Referring again to FIG. 1, once the triplets have been formed, they are used to train the neural network (130). Training involves adjusting the neural network's weights or parameters to achieve a global or local minimum according to a loss function, such as an N-pair loss function, triplet loss function with L1 norm, triplet loss function with L2 norm, lifted structure loss function, or margin-based loss function. Once the parameters have been properly adjusted, the neural network can be used in a similarity ranking engine or recommendation engine.

Manual or Collaborative Filtering for Triplets

FIG. 2A illustrates a process 200 of collecting product images; applying collaborative filtering to those product images to form triplets of anchor, similar, and dissimilar images; and using the triplets to train a neural network for use in a product recommendation engine. In this case, the similarity is based on whether the products were purchased together. This process 200 is a more specific version of the generic process 100 shown in FIG. 1.

The process 200 in FIG. 2A begins with collecting information (210) representing user-product purchase information. This information can be represented numerically, e.g., in the form of user-product matrix 212 whose entries represent whether or not a particular product is purchased by a particular individual. These products are clustered together (220) by feature(s) learned using collaborative filtering, such as the user-product purchase matrix 212. For instance, the products may be clustered using the user-product purchase matrix itself or, especially when the number of users and/or products is prohibitively large, matrix factorization as shown in FIG. 2B. The resulting clusters 222 can be used to generate triplets 232 of images of anchor, similar, and dissimilar items (224) that are used to train a deep convolutional neural network to recognize images of similar products.

Generating Pre-Filtered Triplets

Figure 3:
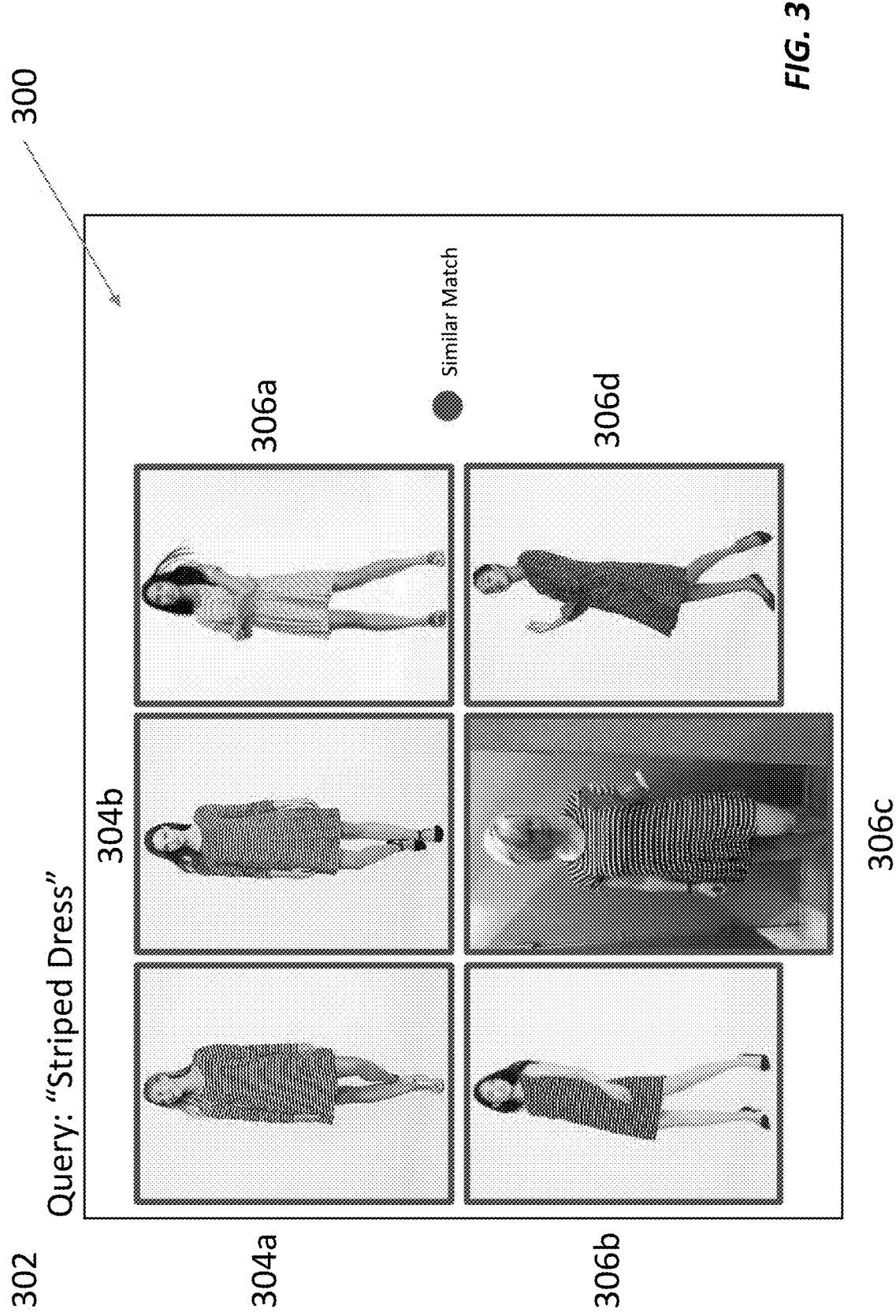
FIG. 3 illustrates generating triplets by searching an image database and classifying the search results as similar (positive) items.

FIG. 3 illustrates an alternative method 300 of generating triplets for training a neural network for a similarity system or recommendation engine. In this method 300, a user runs a key word query 302 on an image database using a search engine (e.g., a Google image search). The key word query 302 returns a set of images ranked in order of relevance to the key word query 302. In the example shown in FIG. 3, the key word query 302 is for a "striped dress," and the first six results are different images of visually similar striped dresses. Any two images in this set of six images can serve as a pair including an anchor image and a positive image. Specifically, there are 21 possible unique pairs of anchor and positive images from this single search query. Note that the images are not labeled at the instance- or category-level. The negative image can be selected randomly from among the other images in the image database (e.g., from among those images that weren't returned in response to the key word query 302).

Running the key word query 302 with the search engine leverages the search engine's subjective similarity rankings (as opposed to the objective similarity ranking of other work) to classify the training data as anchor, similar, and dissimilar images based on the key word. In other words, the similarity metric used here is the similarity defined by the search engine between keyword(s) and images. The objective similarity metric of prior work is defined by instance-level or category-level agreement between the anchor image and positive image. Using the subjective similarity metric reduces or eliminates the need to filter raw data as in the process 200 shown in FIG. 2A while achieving competitive results.

Adjusting the Parameters of the Neural Network

Figure 4:
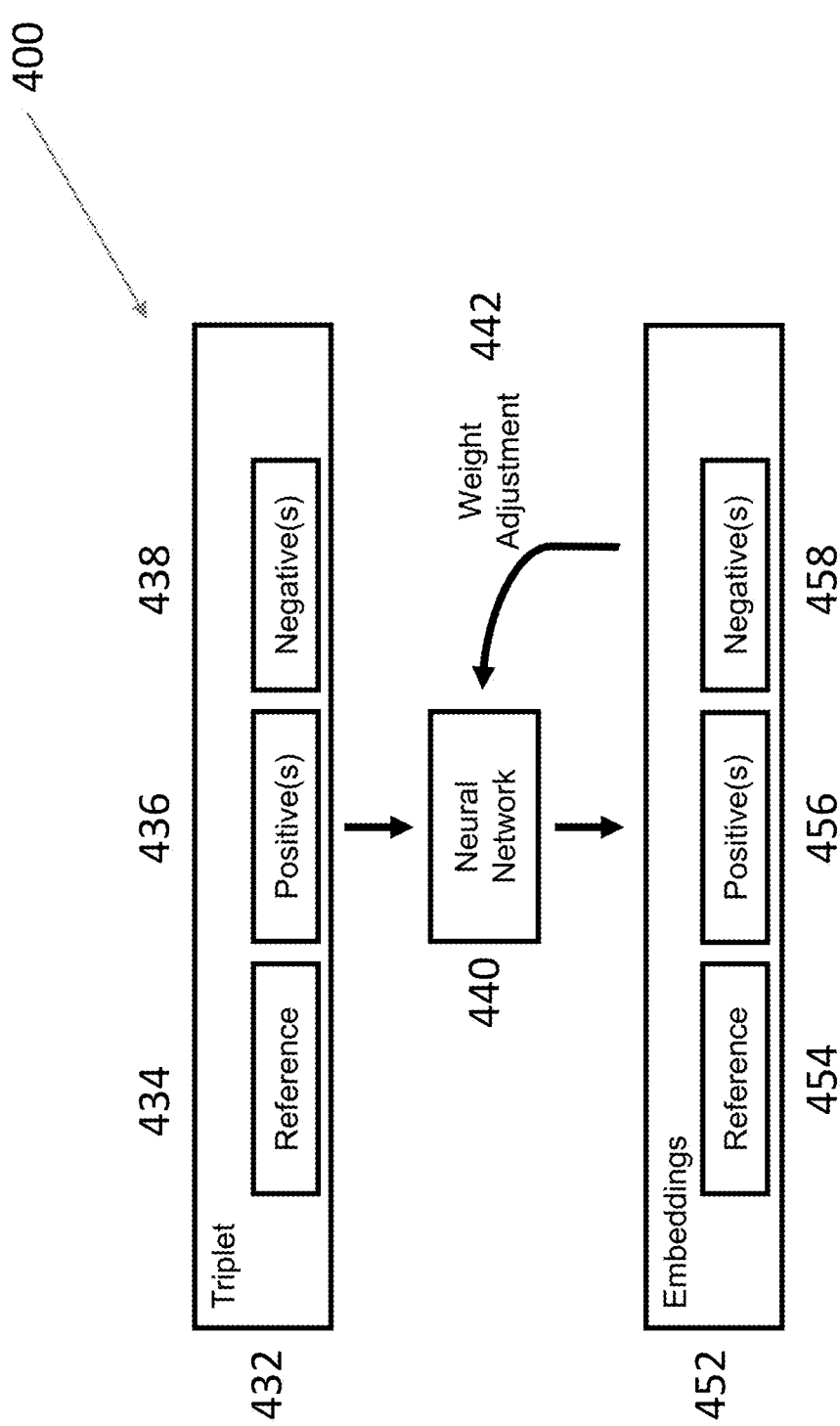
FIG. 4 shows a process of training a neural network using triplets formed of images of anchor (reference), similar (positive), and dissimilar (negative) items.

FIG. 4 shows a process 400 for iteratively adjusting the parameters or weights of a neural network 440 using the triplets described above (e.g., as in step 130 of FIG. 1 and step 230 of FIG. 2A). Each of these triplets is passed through the neural network 440 to generate for a corresponding output of extracted features in the form of embeddings, which are vectors of numbers. Calculating the loss from the extracted features yields feedback that is used to adjust the parameters of the neural network 440 based on the loss before the next iteration and triplet set are passed through the network. For simple mapping functions (e.g., a one-layer neural network), the parameters may be determined by using a closed-form, non-iterative optimization method FIG. 4 shows this mapping for a triplet 432 that includes a reference data point 434 (e.g., an image of a first object), positive data point(s) (e.g., an image of a second item similar but not the same as the first item), and negative data point(s) (e.g., an image of a third item unlike the first item). This triplet 432 is passed through the neural network 440 to generate embeddings 452, including a reference embedding 454, a positive embedding 456, and a negative embedding 458. Computing a loss function from the embeddings 452 yields weight adjustments 442 for the neural network.

The features extracted from the neural network or mapping function processing an image may resemble edges or corners detected in the image that are useful for generating similarity scores between the images of the data set. If a particular feature of the image is noise or irrelevant for generating similarity scores (e.g. background behind object of interest), the neural network, if robust enough, may learn to ignore these features.

The loss function which is used to adjust the model parameters is determined so that feature embeddings, which take the form of vectors of numbers, of the reference data point(s) and positive data point(s) in each triplet are less distant and feature embeddings of the reference data point(s) and negative data point(s) in each triplet are more distant.

The neural network or mapping function may be configured to extract features from images (e.g., for visual features) or any of the aforementioned inputs The neural network may be configured to use convolutional layers. Each convolutional layer's parameters comprise a set of learnable filters (or kernels), which have a small receptive field. During computation of the model, each filter is convolved across the input, producing an activation map of that filter. As a result, the network learns filters that activate when it detects some specific type of feature at some spatial position in the input. Convolutional layers are particularly useful for learning translation invariance of features found in images. With properly tuned convolutional layers, a feature is equally recognized in one region of the image as in another.

The neural network may be a deep neural network (i.e., a neural network with more than one hidden layer). Deep neural networks utilize more parameters than simple neural networks and are therefore more capable of learning complex features.

The neural network may use a regularization method like batch normalization to improve training speed and reduce overfitting of the model.

The neural network may use a rectified linear unit activation to compute each individual neuron's activation. Other possible activation functions that may be used include the log-sigmoid and tan-sigmoid.

The neural network may be configured to use pooling layers. It may also be configured to use fully connected layers. Fully connected layers are layers which have neurons that are fully connected to the previous layer's neurons. For n neurons in the current fully connected layer and m neurons in the previous layer, there are nm connections and parameter weights between the two layers.

The neural network may be trained by minimizing an objective loss function for one negative data point:

$$L(x_r, x_p, x_n) = \max\left(0, m - \|x_a - x_n\|_2^2 + \|x_a + x_p\|_2^2\right)$$

$$L(x_r, x_p, x_n) = \max\left(0, m - \frac{\|x_a - x_n\|_2^2}{\|x_a + x_p\|_2^2}\right)$$

$$L(x_r, x_p, x_n) = \max\left(0, m - \frac{\exp(\|x_a - x_{n_i}\|_2^2)}{\exp(\|x_a + x_p\|_2^2)}\right)$$

The neural network may also be trained by minimizing an objective loss function for multiple negative data points. This objective loss function is an extension of the first set of loss functions described:

$$L(x_r, x_p, x_{n_1} \ldots x_{n_k}) = \sum_{i=1}^{k} \max\left(0, m - \|x_a - x_{n_i}\|_2^2 + \|x_a + x_p\|_2^2\right)$$

$$L(x_r, x_p, x_{n_1} \ldots x_{n_k}) = \sum_{i=1}^{k} \max\left(0, 1 - \frac{\|x_a - x_{n_i}\|_2^2}{\|x_a + x_p\|_2^2}\right)$$

$$L(x_r, x_p, x_{n_1} \ldots x_{n_k}) = \sum_{i=1}^{k} \max\left(0, 1 - \frac{\exp(\|x_a - x_{n_i}\|_2^2)}{\exp(\|x_a + x_p\|_2^2)}\right)$$

In the above formulations, $x_r$ is the feature embedding, in the form of a vector, of the reference data point, $x_p$ is the feature embedding of the positive data point, $x_n$ is the feature embedding of the negative data point, $x_{n_i}$ is the feature embedding of the i-th negative data point for triplets which are comprised of k negative data points, and m is the margin of distance between positive and negative pairs. The distance may be computed by using Euclidean distance.

During training/parameters adjustment, the neural network may reach a global minimum or a local minimum for the objective loss function(s).

Neural network parameter updates may be computed by using stochastic gradient descent and backpropagation of the objective loss function.

The feature embedding vector may be the last layer of activations of the neural network model. The feature embeddings generated by the similarity ranking engine may be supplemented with additional features generated separately. The feature embeddings may be used in vector arithmetic operations to create new feature embeddings.

Operation of a Neural Network Trained on Similar Triplets

A neural network trained on similar triplets generates similarity rankings, e.g., as part of the operation of a recommendation engine. The trained neural network (i.e., the layer configuration and specific parameters generated during the training process 400 of FIG. 4) is used to generate a feature embedding of any data point(s) that is passed through the trained neural network. The feature embeddings are used as substitutes for the original data from which the feature embeddings were calculated when generating similarity rankings. This yields the practical advantages of (1) reducing the computation required to calculate similarity if there are fewer dimensions in the output than in the input and (2) improving the quality of each dimension (feature) used to generate similarity rankings between two items by extracting only the relevant information from the input data points.

To generate similarity rankings, the similarity ranking engine may follow this process: for each n data points, it calculates (e.g., using a computer processor, graphics processor, or cloud-based processor) the distance between the image and all n−1 images to create an n×n similarity matrix, where the entry at the i-th row and j-th column corresponds to the computed similarity between the i-th data point and the j-th data point. The similarity engine may compute this distance using Euclidean distance, cosine similarity, Manhattan distance, Hamming distance, or any other suitable distance metric.

For visual similarity rankings, 1 pixel of 10,000 pixels in a 100 pixel by 100 pixel black-and-white image is less meaningful for determining visual similarity than a shape or edge detected by the neural network. Vectors of feature embeddings that are closer to each other are ranked more visually similar than vectors of feature embeddings that are further from each other, which are ranked less visually similar.

The similarity rankings may be pre-computed given the dataset to speed up recommendations in the future.

The similarity rankings may be used in a recommendation engine where more similar items are considered better to recommend.

Figure 5:
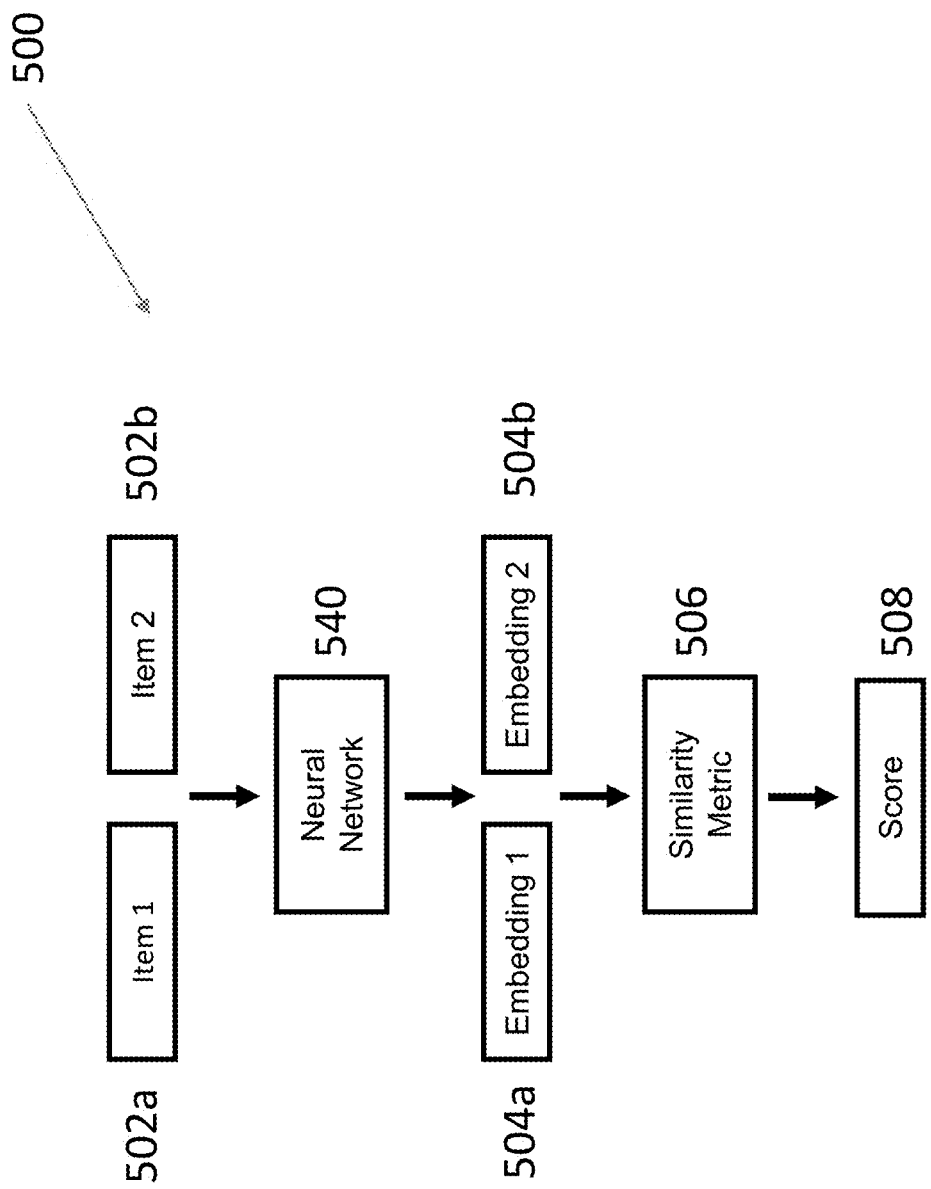
FIG. 5 shows a process of using a triplet-trained neural network to generate similarity scores for a pair of different items.

FIG. 5 illustrates a process 500 of computing visual similarity rankings using a trained neural network 540, e.g., for use in a recommendation engine that recommends articles of clothing. Before the process 500 begins, a plurality of triplets is first generated by classifying reference images of clothing items as three positive images of similar clothing items and randomly selecting three negative images from the set of all images in the dataset. For large datasets, the false negative error rate caused by inadvertently selecting an image of a similar item as a negative image is negligible. The neural network parameters are adjusted iteratively by, for each triplet in the plurality of triplets, reducing or minimizing the triplet loss function and backpropagating parameters updates.

In operation, the trained neural network 540 receives a first image 502a showing a first clothing item and a second image 502b showing a second clothing item. It produces a first embedding 504a (output vector) representing features of the first image 502a and a second embedding 504b (output vector) representing features of the second image 502b. Comparing these first embedding 504a and the second embedding 504b using a visual similarity metric 506 generates a score 508 representing the distance in feature space between the embeddings. For example, Euclidean distance can be the visual similarity metric 506, and the score 508 can be the output of the Euclidean distance applied to the two embeddings 504a and 504b. In other words, the metric 506 is the function and the score is the output 508. If the input images 502a and 502b show similar clothing items, the embeddings 504a and 504b are less distant in feature space than for any two input images of dissimilar clothing items.

Figure 6:
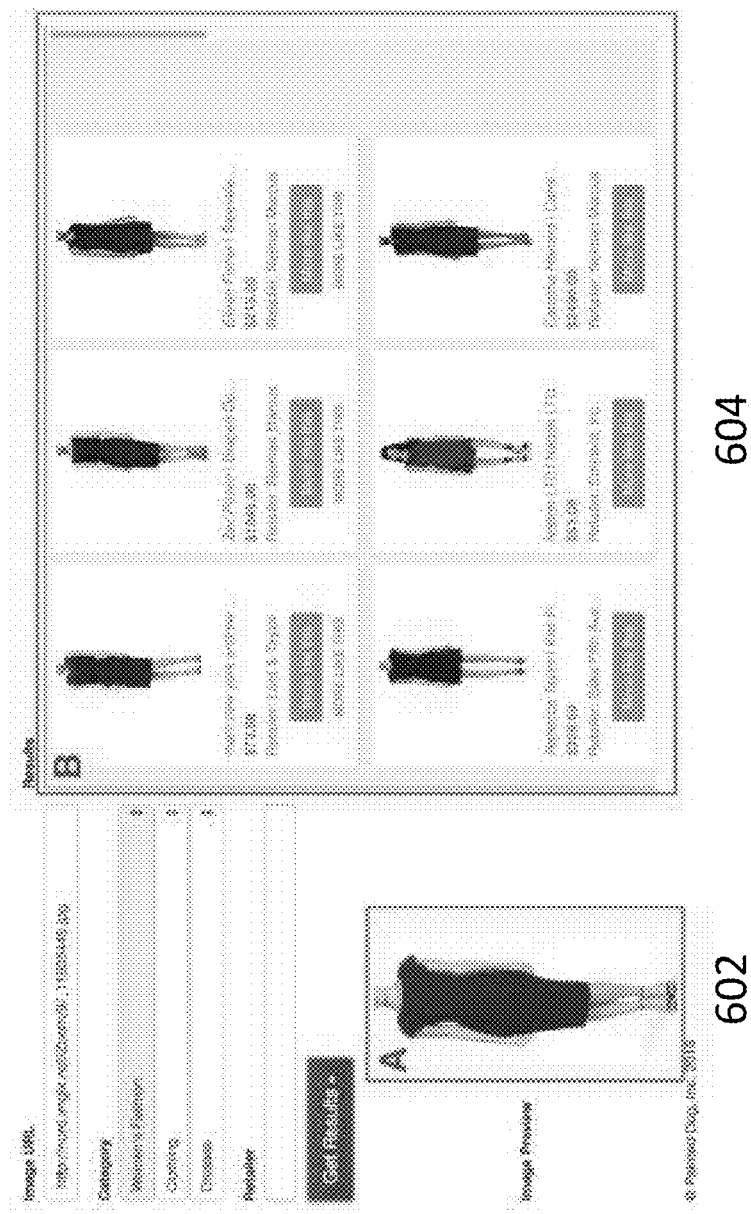
FIG. 6 shows an example use of a recommendation engine/similarity system with a triplet-trained neural network, which returns similar results in descending order of similarity (B) in response to a query image (A) input by a user.

The process 500 shown in FIG. 5 can be used in an e-commerce platform to identify and recommend similar items in response to user queries. Consider an e-commerce platform with 10,000 dresses for sale. As shown in FIG. 6, for a user visiting the product page of one dress 602 on the e-commerce platform, the process 500 could be used to process the images of all 10,000 dresses and recommend to the user the six dresses 604 that lie closest to the dress of interest in feature space. This is an example of a visual similarity recommendation engine which uses the salient visual features of a product image to recommend similar products.

Recommendation System with Neural Networks Trained with on Similar Triplets

Figure 7:
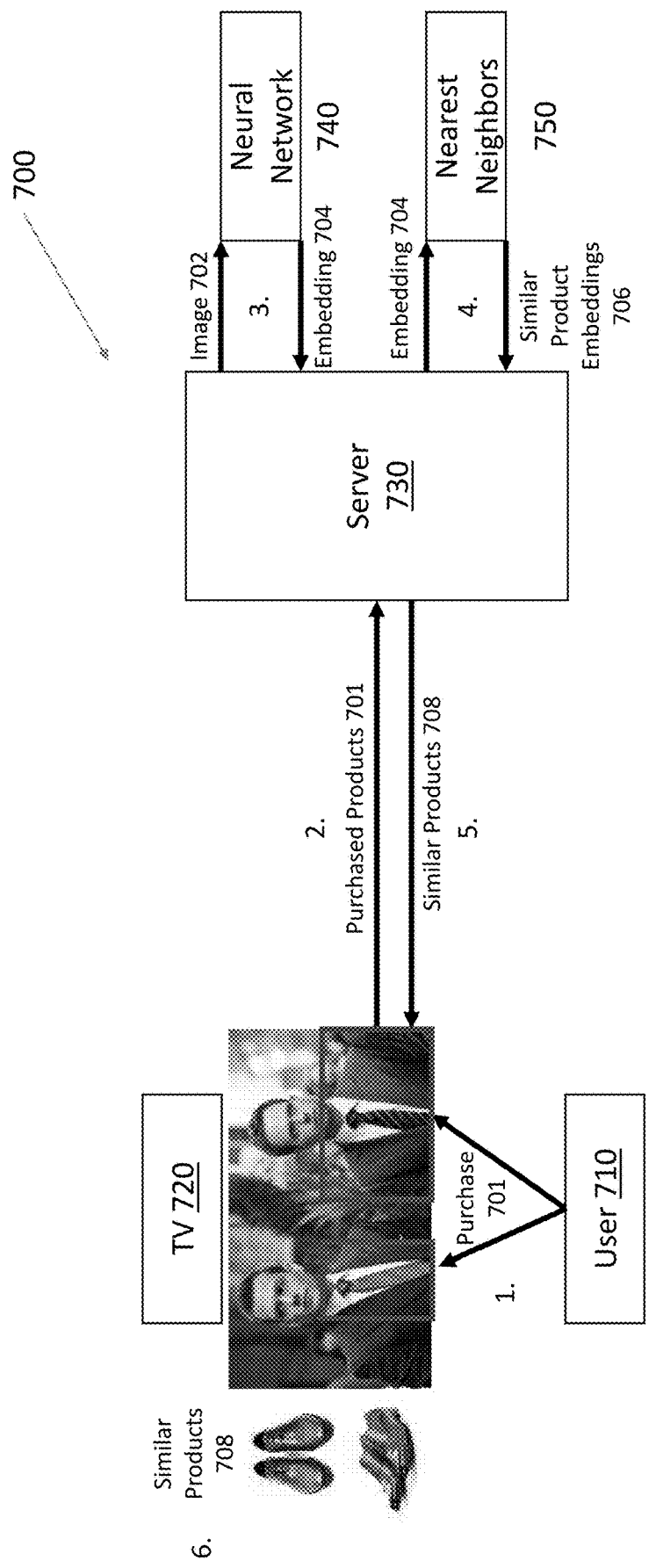
FIG. 7 illustrates a recommendation engine/similarity system configured to recommend products seen in a television show using a triplet-trained neural network.

FIG. 7 illustrates the operation of a recommendation system 700 that uses a neural network 740 trained on clothing items that are visually appealing when worn together. The system 700 includes a server 730 that is coupled via a network connection (e.g., via the internet) to a user interface, such as a television 720, computer, tablet, smartphone, or other device for showing videos to a user 710. As readily understood by those of ordinary skill in the art, the server 730 includes a memory that stores the parameters (weights) for the trained neural network and a processor implements the trained neural network 740 and is also coupled to a database 750 that stores information about products that may appear in the videos presented to the user.

In operation, the user 710 may watch a video, such as a television show, on the television 720. When the user 710 would like to purchase or learn more about an item that appears in the video, he or she selects the item using an appropriate interface, such those described in U.S. application Ser. No. 14/527,854 or International Application No. PCT/US2017/062284, each of which is incorporated herein by reference in its entirety. The interface transmits information about the purchased product 701 to the server 730, which uses the neural network 740 to generate an embedding 704 of an image 702 of the purchased product 701. The server 730 uses the embedding 704 to query the database 750 for embeddings 706 of similar products 708. The server 730 uses the returned embeddings 706 to identify the similar products 708. The server 730 sends images or other representations of these similar products 708 to the television 720, which may be displayed to the user 710 via the interface on the television 720.

Figure 8A:
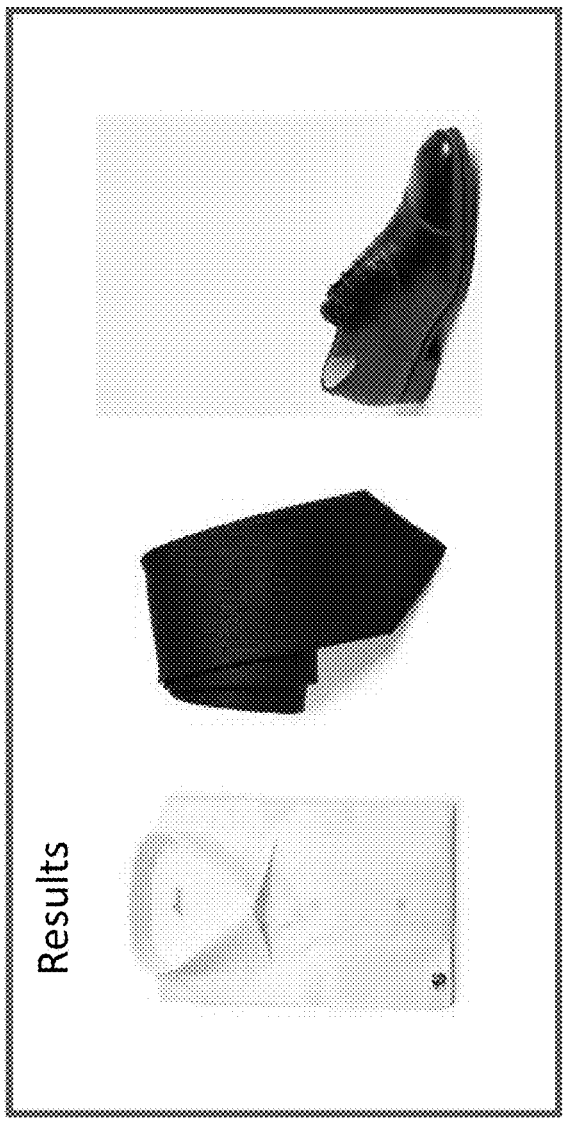
FIGS. 8A and 8B illustrate other modalities that for which the recommendation engine/similarity system of FIG. 7 can be used.
Figure 8A:
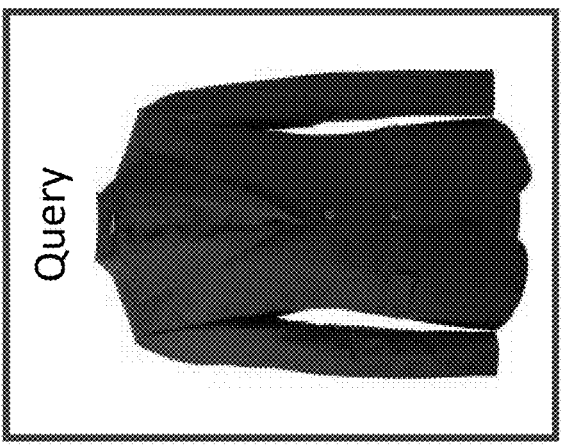
Figure 8B:
Figure 8B:
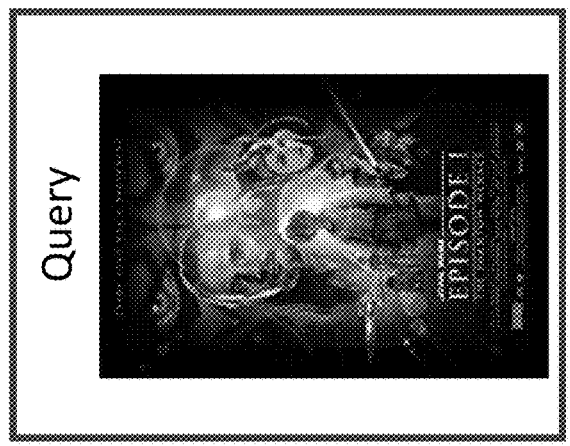

Note that similar in this context does not necessarily mean visually similar. In FIG. 7, for example, the purchased product 701 is a tie and the similar products 708 are shoes that match the tie. If the purchased product (query) is a jacket, the server 720 might return a jacket, tie, and shoes as similar items as shown in FIG. 8A. Or if the purchased product (query) is a movie, the similar items may be movies with similar titles, themes, or casts as shown in FIG. 8B. Note that the images in FIGS. 8A and 8B don't have to be the sole input features of the metric learning system. For instance, the input feature for FIG. 8B could be a movie poster, a movie trailer, name of a cast member, or even a text description of the plot of still frame from the movie.

The recommender system 700 shown in FIG. 7 can also be trained to recommend social media content primarily in text format. In this case, the recommender system 700 matches content (e.g., text) to a user given the user's intrinsic preferences and history interacting with other social media content. Such a recommender system might begin by using a matrix factorization method to optimize an embedding function to match users (e.g., user-item histories, such as a weighted combination of the embeddings of the content a user has "liked") with individual item embeddings. It takes the output of this collaborative filtering—a vector space in which user history and item embeddings both reside—and uses the latent space learned by the collaborative filtering model to supervise training of a deep metric learning network.

The metric learning neural network might recurrently take as input features the text of the given social media content using a recurrent neural network. For a user, the metric learning neural network might create a separate embedding for each item in the user history using a recurrent neural network and take a weighted average or time-weighted average of the items to represent the user's history. Using a metric learning objective function (e.g., triplet loss, n-pair loss), the neural network is optimized using stochastic gradient descent to match user histories and items which are ranked similarly in the collaborative filtering method, but through a content-based lens. Once the neural network has been trained, it can recommend similar social media content to the user.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of similarity ranking, the method comprising:
generating, with a neural network trained on triplets of respective anchor data points, extrinsically similar data points with one or more similarities to the anchor data points that vary as a function of an independent variable, and negative data points, a feature embedding for input provided by a user;
performing a comparison of the feature embedding to feature embeddings generated by the neural network for possible recommendations; and
returning, based on the comparison, a recommendation having extrinsic properties similar to extrinsic properties of the input.

2. The method of claim 1, wherein the input comprises at least one of text of social media content, an item appearing in a video, a movie poster, a movie trailer, a name of a cast member, or a text description of a plot of a movie.

3. The method of claim 1, wherein generating the feature embedding of the input comprises generating a numerical representation of an image, an audio clip, or a text passage.

4. The method of claim 1, wherein the possible recommendations comprise movies, television shows, and/or news stories.

5. The method of claim 1, wherein the input and the recommendation are of different modalities.

6. The method of claim 1, wherein the anchor data points and extrinsically similar data points have a non-stationary extrinsic similarity distribution.

7. The method of claim 6, wherein the non-stationary extrinsic similarity distribution varies as a function of at least one of time or geographic location.

8. The method of claim 1, further comprising:
generating the triplets; and
training the neural network on the triplets.

9. The method of claim 8, wherein generating the triplets comprises retrieving candidate anchor data points, candidate extrinsically similar data points, and/or candidate negative data points from a database.

10. The method of claim 9, wherein retrieving the candidate anchor data points from the database comprises performing a query against the database and retrieving the candidate negative data points comprises randomly selecting entries from the database from among entries not returned in response to the query.

11. The method of claim 8, wherein generating the triplets comprises classifying an image of a first object as the anchor data point of a first triplet and classifying an image of a second object different than the first object as the extrinsically similar data point of the first triplet.

12. The method of claim 11, wherein classifying the image of the second object as the first extrinsically similar data point comprises:
conducting a search of an image database using a name of the first object; and
identifying a result of the search of the image database as the image of the second object.

13. The method of claim 12, further comprising:
randomly selecting an image in the image database not returned in the search of the image database as the negative data point in the first triplet.

14. The method of claim 8, wherein generating the triplets comprises generating between about $5 \times 10^6$ triplets to about $1.25 \times 10^{12}$ triplets.

15. The method of claim 8, wherein generating the triplets comprises generating the triplets from between about 2000 total images and about 1,000,000 total images and at least 4 images per class of extrinsically similar object.

16. The method of claim 8, wherein training the neural network on the triplets comprises, for each of the triplets:
passing the anchor data point, the extrinsically similar data point, and the negative data point in each triplet through the neural network to generate extracted features;
calculating a loss from the extracted features; and
adjusting parameters of the neural network based on the loss.

17. The method of claim 16, wherein calculating the loss comprises calculating at least one of an N-pair loss, a triplet loss with L1 norm, a triplet loss with L2 norm, a lifted structure loss, or a margin-based loss.

18. A recommendation system comprising:
a server to:
implement a neural network trained on triplets of respective anchor data points, extrinsically similar data points with one or more similarities to the anchor data points that vary as a function of an independent variable, and negative data points;
generate a feature embedding of an input provided by a user;
perform a comparison of the feature embedding to feature embeddings of possible recommendations generated by the neural network; and
return, based on the comparison, a recommendation having extrinsic properties similar to extrinsic properties of the input.

19. The recommendation system of claim 18, further comprising:
a user interface, operably coupled to the server, to display an image associated with the input to the user and to receive the input from the user.

20. The recommendation system of claim 18, wherein the recommendation is relevant to the extrinsic properties of the input.

21. The recommendation system of claim 20, wherein the extrinsic properties are based on non-stationary factors of the input, the non-stationary factors comprising at least one of time or geographic location associated with the input.

22. The recommendation system of claim 18, wherein the recommendation is based on intrinsic properties of the input and the extrinsic properties of the input.

23. The recommendation system of claim 18, further comprising:
searching reference data to identify the extrinsically similar data points;
selecting, at random, second data points from a portion of the reference data excluding the extrinsically similar data points and classifying the second data points as the negative data points; and
training the neural network using the extrinsically similar data points and the negative data points.

24. A method of similarity ranking, the method comprising:
generating, with a neural network trained on triplets of respective anchor data points, extrinsically similar data points representing objects that are visually dissimilar to objects represented by the anchor data points, and negative data points, a feature embedding for input provided by a user;
performing a comparison of the feature embedding to feature embeddings generated by the neural network for possible recommendations; and returning, based on the comparison, a recommendation having extrinsic properties similar to extrinsic properties of the input.

* * * * *